US007726452B2

(12) United States Patent
Kraner

(10) Patent No.: US 7,726,452 B2
(45) Date of Patent: Jun. 1, 2010

(54) SYSTEMS AND METHODS FOR ACTIVE VIBRATION DAMPING

(75) Inventor: Emil Kraner, Newton, MA (US)

(73) Assignee: Technical Manufacturing Corporation, Peabody, MA (US)

( * ) Notice: Subject to any disclaimer, the term of this patent is extended or adjusted under 35 U.S.C. 154(b) by 0 days.

(21) Appl. No.: 11/143,236

(22) Filed: Jun. 2, 2005

(65) Prior Publication Data
US 2006/0272910 A1 Dec. 7, 2006

(51) Int. Cl.
F16F 7/10 (2006.01)
F16M 13/00 (2006.01)
(52) U.S. Cl. .................. 188/378; 267/136; 248/550; 248/636; 248/638
(58) Field of Classification Search .......... 188/378, 188/379, 380; 267/136, 140.11, 140.13, 267/140.14, 140.15; 248/550, 562, 566, 248/636, 637, 638
See application file for complete search history.

(56) References Cited

U.S. PATENT DOCUMENTS

| 3,703,999 | A | * | 11/1972 | Forys et al. ............... 248/550 |
| 4,476,969 | A | * | 10/1984 | Dykema .................... 188/380 |
| 4,796,873 | A | | 1/1989 | Schubert |
| 4,821,205 | A | * | 4/1989 | Schutten et al. ........... 700/280 |
| 5,092,800 | A | * | 3/1992 | Hirt ........................... 440/52 |
| 5,318,156 | A | * | 6/1994 | Davis ......................... 188/298 |
| 5,433,422 | A | * | 7/1995 | Ross et al. ............. 267/140.15 |
| 5,660,255 | A | * | 8/1997 | Schubert et al. ........... 188/378 |
| 5,823,307 | A | * | 10/1998 | Schubert et al. ........... 188/378 |
| 5,975,508 | A | * | 11/1999 | Beard ........................ 267/136 |
| 6,032,770 | A | * | 3/2000 | Alcone et al. .............. 188/378 |
| 6,354,576 | B1 | * | 3/2002 | Jacobs et al. ........... 267/140.14 |
| 6,374,968 | B1 | * | 4/2002 | Noe ........................... 188/380 |
| 6,378,672 | B1 | * | 4/2002 | Wakui ........................ 188/378 |
| 6,570,298 | B2 | | 5/2003 | Yasuda ....................... 310/328 |

(Continued)

FOREIGN PATENT DOCUMENTS

WO WO 2005026573 A1 * 3/2005

OTHER PUBLICATIONS

PCT International Search Report based on PCT/US06/19264 dated Dec. 20, 2007.

*Primary Examiner*—Thomas J Williams
(74) *Attorney, Agent, or Firm*—Chinh H. Pham; Greenberg Traurig, LLP

(57) ABSTRACT

An active vibration damping system having a supporting spring for addressing a static force from a payload, and an independent actively isolated damper positioned in parallel between a payload and a source of vibration for damping dynamic force from the payload to an actively isolated point. The actively isolated damper includes a small intermediate mass, distinct and decoupled from the payload mass, and a passive isolator element for dynamic coupling of the isolated platform to the small intermediate mass. The small intermediate mass provides a point to which dynamic forces from the payload may be dampened. The active damper also includes at least one actuator coupled at one surface to the small intermediate mass and coupled at a second surface to the vibrating base platform. A motion sensor may also be provided on the small intermediate mass so as to generate a feedback signal as a function of the movement of the small intermediate mass. The motion sensor together with a compensation/amplifier module and the actuator act as part of a feedback compensation loop for minimizing vibration.

26 Claims, 5 Drawing Sheets

U.S. PATENT DOCUMENTS

| | | | |
|---|---|---|---|
| 6,752,250 B2 * | 6/2004 | Tanner | 188/267 |
| 6,758,312 B2 * | 7/2004 | Heiland | 188/378 |
| 6,935,471 B2 * | 8/2005 | Noe | 188/378 |
| 2006/0151272 A1 * | 7/2006 | Smith et al. | 188/378 |
| 2007/0273074 A1 * | 11/2007 | Mizuno et al. | 267/136 |

* cited by examiner

SYSTEMS AND METHODS FOR ACTIVE VIBRATION DAMPING

TECHNICAL FIELD

The present invention relates generally to methods and systems for active vibration damping of supported payloads, and more particularly to vibration damping systems and methods which decouple static and dynamic forces generated by the supported payloads and damps dynamic forces to an actively isolated point.

BACKGROUND ART

The need in industry for vibration isolation is growing. For example, there is less and less tolerance for environmental vibration in ultraviolet steppers used in semiconductor manufacturing. As the manufacturing of semiconductors and other products becomes more and more precise, the need for suppressing environmental vibration becomes greater and greater.

Many currently available vibration isolation applications that are based upon "soft springs" also require relatively high level of damping. Dampers are often used to reduce vibration amplification at the resonance frequency of the spring, and to minimize distortion generated on the isolated mass by the moving stages, motors, etc. Unfortunately, acceptable levels of damping can be very limited in most of the available systems. One limiting factor can be attributed to the stiffness increase of the combined damper-spring system, which can result in shifting up the resonance frequency of the system, and in decreasing of the gain/frequency function, i.e., the "roll off" slope above the resonance frequency. As a result, there tends to be a significant loss in vibration isolation gain beyond the resonance frequency.

In general, the level of damping can be determined by (i) the settling time, which is directly related to the resonance frequency of the system and the level of vibration amplification at that frequency, (ii) the vibration isolation specification, especially at high frequency, and/or (iii) the damper type (e.g., active, passive). Known examples of passive dampers include dashpot dampers and fluid dampers. Passive dampers are typically used to benefit system vibration isolation at the resonance frequency of the spring. However, since these dampers are usually coupled to the vibrating base platform, for frequencies above resonance frequencies, these dampers can reduce vibration isolation gains by approximately 20 dB per decade.

Active dampers, on the other hand, may include, for instance, voice coil dampers or motor elements. Active dampers may be used to produce relatively high compensation forces, and along with sensors on the isolated payload, can compensate for the forces generated by the heavy payload moved with high acceleration. However, active dampers also have very limited active bandwidth gain. In particular, the coupling of payload resonances with sensed outputs can compromise stability margins. This limitation may be due to the servo loop stability that can be limited by the required attachment of vibration sensors to the isolated platform sensing its multiple resonances.

Generally, a supported payload can often involve moving mechanical components, which can generate dynamic forces that act on the payload and cause it to vibrate in response. The payload, in addition, has a mass that generates a static force. In most existing isolation systems both the static and dynamic forces are permitted to act on a vibration compensation mechanism, for instance, an actuator, and require such compensation mechanism to address both the static and dynamic forces when minimizing vibration. Such an approach requires the use of a very powerful actuator or multiple actuators, both of which can be expensive and bulky. Moreover, finding a compromise between the damping level and vibration isolation gain can be a difficult engineering task.

Accordingly, it is desirable to provide a practicable damping system that can provide relatively high damping forces while at the same time improves vibration isolation.

SUMMARY OF THE INVENTION

The present invention provides an active vibration damping system that decouples static and dynamic forces generated by a payload, permits each of the two forces to be addressed by separate mechanisms, and improves vibration isolation by directing dynamic forces from the payload to an actively isolated point. The vibration damping system, in one embodiment, includes a supporting spring for addressing the static force from the payload mass, and an actively isolated damper positioned in parallel between the payload mass, such as an isolated platform, and a source of vibration, such as the floor, external casing, or a vibrating base platform, to damp the dynamic force from the payload mass. The actively isolated damper ("active damper"), in an embodiment, includes a small intermediate mass, distinct and elastically decoupled from the payload mass. The small intermediate mass may be at least one order of magnitude smaller than the range of masses that the system is designed to support or isolate, and may act as a support point for a dynamic load. The active damper also includes at least one actuator, such as a piezoelectric motor element, having a first surface coupled to the small intermediate mass and a second surface coupled to the vibrating base platform. The actuator may include a spring system designed to be at least one order of magnitude higher in stiffness than the supporting spring. The active damper further includes a passive isolator element, such as a passive fluid damper ("passive damper"), for coupling the isolated platform to the small intermediate mass. In one embodiment, a motion sensor may be coupled to the small intermediate mass, so as to generate a feedback signal to the actuator as a function of the movement of the small intermediate mass. The motion sensor may be designed to be decoupled from the isolated platform.

The vibration damping system of the present invention may also be provided with a compensation module to receive the feedback signal from the motion sensor. In one embodiment, the compensation module may communicate with the actuator to permit the actuator to vary its length as a function of the feedback signal to reduce vibration to the passive damper and intermediate-mass. The compensation module may also be designed in such a way that the active feedback system may be stable over a predetermined range of vibration frequencies independent of the payload masses. In one embodiment, the compensation module may be provided along an axis in which the passive damper operates, so as to permit the intermediate mass to be actively isolated from vibration in that same axis. Alternatively, independent compensation modules may be provided along each of the "X", "Y" and "Z" axes to permit the intermediate mass to be actively isolated from vibration along six degrees of freedom. In other words, vibration along each of the "X", "Y" and "Z" axes, as well as vibration rotationally about the "X", "Y" and "Z" axes may be isolated. The intermediate mass and motion sensor may be housed within a case, and may be suspended from the base in at least one axis by at least one actuator. The intermediate mass and motion sensor, of course, may be suspended in each of the "X", "Y", and "Z" axes by at least one actuator in each direction.

A shear decoupler may be positioned between the actuator and the intermediate mass situated along the actively controlled "Z" axis, so as to limit the exertion of shear stresses on the actuator. A shear decoupler may also be positioned in the "X" and "Y" axes between the respective actuators and the intermediate mass to minimize cross axis vibration.

According to another embodiment of the invention, additional compensation circuits can be employed by the compensation module to process signals sent from a sensor mounted on the payload mass. These signals, which may be representative of payload motions, can be combined with the signals from the motion sensor on the intermediate mass to further compensate for payload vibration.

In a further embodiment, a motion sensor may be mounted on the base platform, and the feedforward signals therefrom may be utilized to compensate for the motion from the base platform.

The present invention provides, among other things, a practical active vibration damping system based on an active isolation damper and a supporting spring, both positioned between the payload mass and the base platform. The utilization of an active isolation damper having an intermediate mass with resonance frequency above the active bandwidth, along with a passive damper for decoupling the payload resonances from the intermediate mass as well as providing passive isolation outside of the active isolation frequency range, and an actuator to actively compensate floor vibration and create stiffness relatively higher than the stiffness of the supporting spring can minimize vibration experienced by the payload mass from environmental sources. In addition, the utilization of motion sensors can provide to the actuators, among other things, feedback signals based on motion signals from the various components to further minimize feedback instability to the system.

DESCRIPTION OF SPECIFIC EMBODIMENTS

Supported payload typically generates static and dynamic forces, both of which must be addressed when compensating or minimizing the vibration caused by payload movement. To address both of these forces, the present invention provides a vibration damping system that decouples static and dynamic forces generated by a supported payload and permits each of the two forces to be addressed by separate mechanisms.

Figure 1:
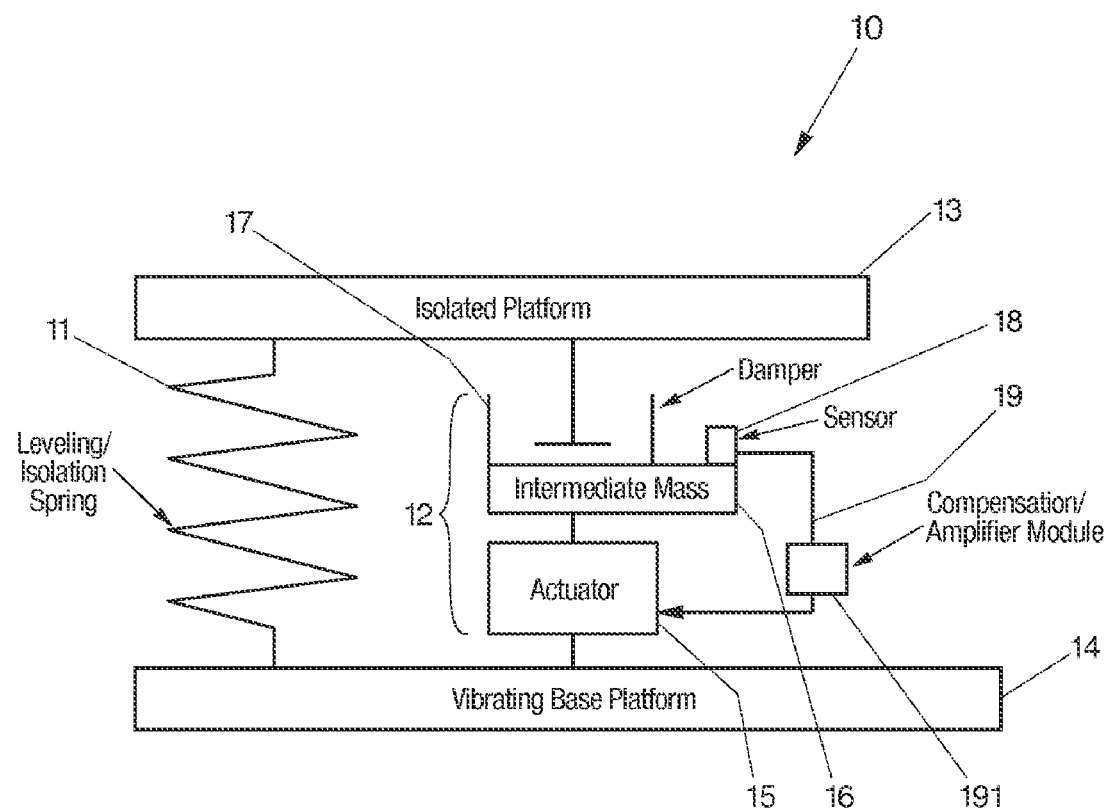
FIG. 1 illustrates a system for active vibration isolation or damping, in accordance with one embodiment of the present invention.

In FIG. 1, the present invention provides an active vibration damping system 10 that can resist or minimize supported payload movement due to payload-induced forces through the use of a supporting spring 11 for addressing static forces, and an independent actively isolated damper 12 ("active damper") positioned in parallel to and spaced relation from the spring 11 for addressing dynamic forces. Both the spring 11 and active damper 12 may be positioned between a payload mass, such as that on or including an isolated platform 13, and a source of vibration, such as the floor, external casing, or a vibrating base platform 14. FIG. 1 illustrates a system which addresses active or dynamic vibration in one of three dimensions. This simplification has been made for the ease of explanation. However, it should be understood that the system is capable of being utilized to permit active vibration isolation up to all six degrees of freedom.

The supporting spring 11, in one embodiment, may be coupled to the isolated platform 13 at one end and extended to the base platform 14 at an opposite end, and may act to support the static force generated by the payload mass. The spring 11 may also act to maintain the isolated platform 13 in substantial parallel relations to the base platform 14. Although FIG. 1 illustrates only one spring 11, it should be appreciated that additional springs 11 may be used depending on the stiffness of the spring 11 relative to the mass of the isolated platform 13. Thus two, three, four or more springs 11 may be used, so long as the isolated platform 13 may be maintained in substantial parallel relations to the base platform 14. Spring 11, in one embodiment, may be a metallic spring, coil spring, die spring, a passive pneumatic spring, a pneumatic spring with active level control, or any other similar springs.

The active damper 12, provided to isolate and minimize dynamic forces from the payload, in an embodiment, includes an actuator 15 that may be coupled to the base platform 14, a small intermediate mass 16 ("intermediate mass") supported on the actuator 15, and a passive isolator element 17 ("passive damper"), for dynamic coupling the isolated platform 13 to the intermediate mass 16. Active damper 12 may also include a motion sensor 18 attached to the intermediate mass 16, such that signals generated from motion of the intermediate mass 16 can be compensated as part of an active feedback compensation loop 19 to provide stability over a predetermined range of vibration frequencies.

Figure 2:
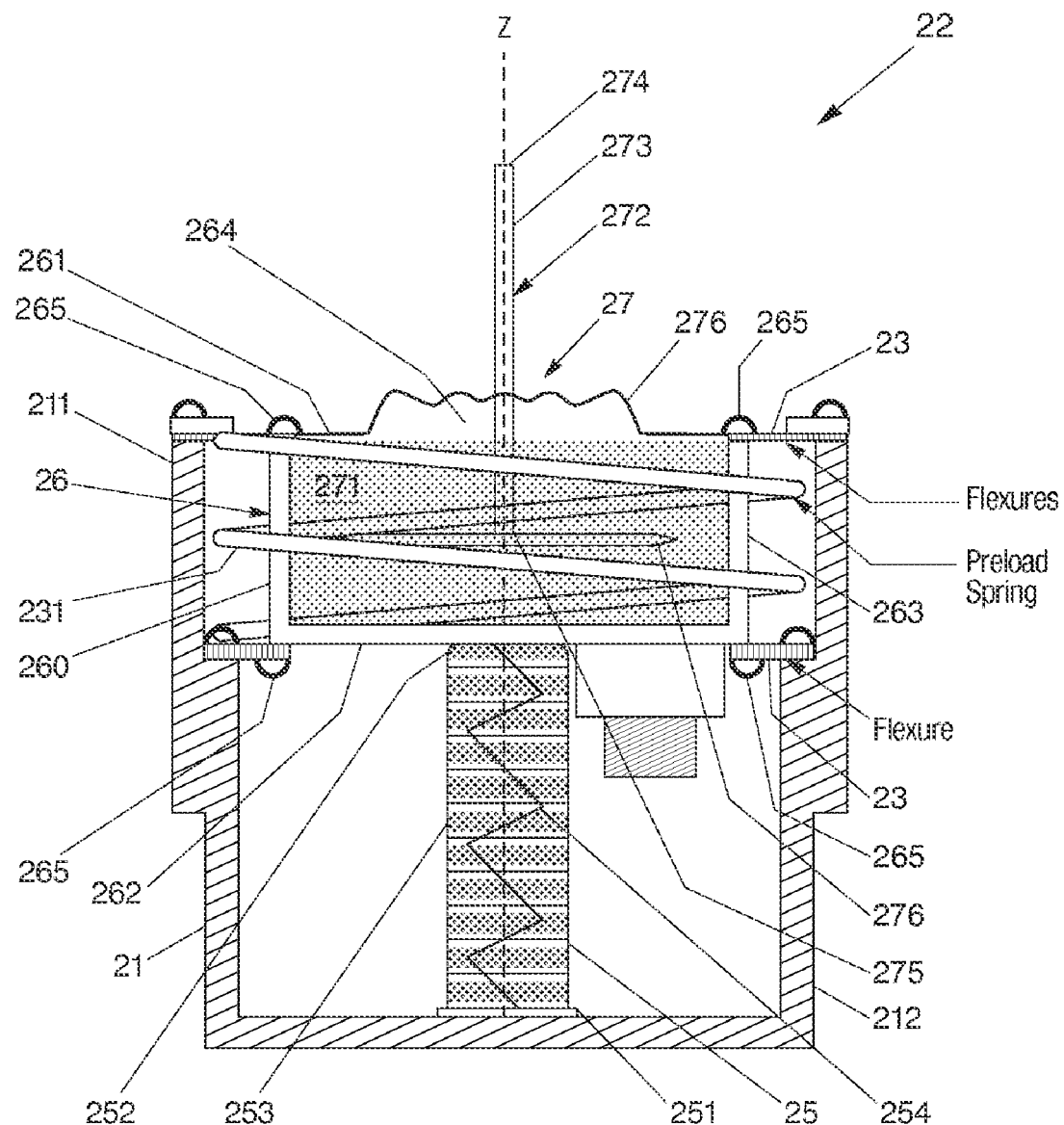
FIG. 2 illustrates a detailed diagram of an active damper for use in connection with the system in FIG. 1.

Looking now at FIG. 2, there is shown, in one embodiment, an active damper 22 for use in connection with the system 10 similar to active damper 12 of FIG. 1. The active damper 22, in this embodiment, includes an actuator 25 having a bottom end 251 attached to a vibrating base platform 24. The actuator 25 also includes a top end 252, which can remain substantially motionless or approximately so, with the objective of minimizing motion to, for instance, 0.01 times the movement of base platform 24. The active damper 22 of the present invention may be designed to isolate vibration of the base platform 24 along axis Z, which is substantially parallel to the axis of displacement of actuator 25.

In one embodiment of the invention, the actuator 25 may be a piezoelectric stack. In such an embodiment, the actuator 25 may include a first substantially rigid element, e.g., a stack 253, having a length along axis Z, and which is variable as a function of a control signal applied thereto.

As a piezoelectric stack (e.g., model P-010-20 from Physik Instrumente (PI) GmbH & Co. KG in Karlsruhe/Palmbach, Germany), actuator 25 may be modeled as a motor spring 254 with sufficient stiffness. The stiffness of the spring 254 along its axis allows the actuator 25 to contract or elongate readily according to the command signal applied thereto and independently from the payload static force. The stiffness of the spring 254, in one embodiment, may be at least one order of magnitude higher in stiffness than that of the supporting spring 11, and preferably at least two orders of magnitude higher in stiffness. In an example, the stiffness of spring 254 may be about 1.9 million pounds per inch, whereas the displacement-to-voltage relationship may be about 1 million volts per inch peak.

With certain types of piezo actuators ((e.g., model P-010-20 from Physik Instrumente (PI) GmbH & Co. KG in Karlsruhe/Palmbach, Germany), it may be necessary to preload the actuator 25, such that under actual operation the actuator 25 may be prevented from going into tension. Spring 231, therefore, may be used to preload the actuator 25. In an embodiment, spring 231 may be a steel spring and may be used to provide a preload compression that is measurably greater the maximum dynamic forces generated on the payload along a compression axis, for instance, axis "Z". The spring 231 may be preloaded by the use of a compression set screw or other means (not shown) to provide the required pound thrust force in the compression direction.

In one embodiment of the present invention, the stack 253 may be designed to include a maximum relative stack displacement of about 0.001 to about 0.005 inches peak. To generate such a displacement, a voltage of about 800 volts may be needed to move the actuator 25 accordingly. In addition, the voltage may be arranged, so that for no movement, about 400 volts DC may be applied to the actuator 25. This bias voltage requires zero current and pre-extends the actuator 25 through about half of its maximum relative displacement. Raising or lowering the voltage can cause the actuator 25 to expand or contract accordingly. In an embodiment, the actuator 25 may reach its fully contracted state at zero volt and may reach its fully extended state at about 1000 volts. The expansion and contraction of actuator 25 with respect to applied voltage may, therefore, be substantially linear.

It should be noted that since actuator 25, in an embodiment of the invention, only addresses the dynamic vibration from the payload and does not address the static forces generated by the mass (i.e., weight) of the payload, the active damper 22 may need to employ only one actuator to sufficiently achieve its damping activity, even if the mass of the payload increases. Moreover, an actuator less expensive and less powerful relative to one that must support the mass of the payload as well as addressing the dynamic forces may be used. Of course, if an actuator equally as powerful as the one that must support the mass of the payload while addressing the dynamic forces is used, such additional power from the actuator can be used to focus on addressing the dynamic forces to provide enhanced vibration damping.

In one example, if the supported payload $M_p$ were supported directly by the actuator 25, the payload resonance frequency may be approximately 130 cycles per second if the payload mass $M_p$ is, for instance, about 1000 pounds in weight. Such a resonance frequency can lead to reduction of vibration isolation gain. The desired gain may be difficult or impossible to obtain at frequencies near that of the payload resonance frequency, which in this case, may be 130 cycles per second. In addition, without correction, the system amplifies vibration greatly at the payload resonance frequency and most of the benefit of the vibration isolation may be lost.

To address this issue, active damper 22 may be provided with an intermediate mass 26 positioned between the actuator 25 and the isolated platform, and decoupled from the payload by a passive damper 27 (see below) to act as an actively isolating point to which dynamic forces from the payload may be dampened. In one embodiment, the intermediate mass 26 may have a mass value of $M_s$, which can be at least one order of magnitude or more (e.g., two orders of magnitude) smaller than the range of masses that the system 10 is designed to support or isolate, $M_p$. The ratio of $M_s$ to $M_p$ should preferably be in the range of about 1 lb. to about 10 lbs. The intermediate mass 26, as illustrated in FIG. 2, may include a housing 260 having a top end 261, a bottom end 262, and body portion 263 extending therebetween. The intermediate mass 26 may be positioned at its bottom end 262 directly on the top end 252 of actuator 25. To secure the position of the intermediate mass 26 over the actuator 25 and to minimize lateral or radial movement of the intermediate mass 26, active damper 22 may be provided with an external casing 21 within which the actuator 25 and the intermediate mass 26 may be situated. In one embodiment, the casing 21 may include a upper portion 211 and a lower portion 212 capable of moving axially along the "Z" axis relatively to one another. A brace 23 may be provided along the interior of casing 21 and between which the intermediate mass 26 may be positioned to further minimize lateral or radial movement of the intermediate mass 26. Of course, any other mechanisms known in the art may be used minimize lateral or radial movement of the intermediate mass 26, for instance, providing an o-ring wedged between the intermediate mass 26 and the interior of the casing 21. In the embodiment shown in FIG. 2, the brace 23 may be secured to the casing 21 by fasteners 265 and the intermediate mass 26 may be secured between the brace 23 also by use of fasteners 265. The brace 23, in one embodiment, may be made from a flexible material to accommodate slight axial movement of the upper portion 211 relative to the lower portion 212 of the casing 21.

Spring 231, which may be used to push actuator 25 into a preload compression state, in an embodiment, may be situated between the top end 261 and bottom end 262 about the body portion 263 of the intermediate mass 26. To retain the spring 231 between the top end 261 and bottom end 262, the spring 231 may be positioned within the brace 23 in a space between the intermediate mass 26 and the interior of the casing 21.

Still looking at FIG. 2, a passive damper 27 may be interposed between the intermediate mass 26 and the isolated platform. In the embodiment shown in FIG. 2, the passive damper 27 may be part of the intermediate mass 26. However, it should be noted that a separate passive damper can be provided independent of the intermediate mass, such as that shown in FIG. 1. The provision of an intermediate mass 26 and passive damper 27 provides, as noted earlier, an actively isolated point to which dynamic forces from the payload may be dampened, and permits feedback gain at very high frequencies, since the passive damper 27 can provide passive vibration isolation at those high frequencies.

In the embodiment illustrated in FIG. 2, the passive damper 27 may be an elastic fluid damper and may include a volume of a viscous fluid 271, such as oil, silicon oil, or any other viscous fluid, within the body portion 263 of the intermediate mass 26. The passive damper 27 may also include a piston 272 extending substantially vertically along axis Z through the top end 261 and into the viscous fluid within the body portion 263 of the intermediate mass 26. To accommodate the extension of the piston 272 through the top end 261, an opening 264 may be provided in the top end 261 of the intermediate mass 26. Piston 272, in one embodiment, includes a rod 273 having an external end 274 for placement against the isolated platform 13 (see FIG. 1) and an internal end 275 for placement within the volume of viscous fluid 271 in the body portion 263 of the intermediate mass 26. Rod 273, in accordance with an embodiment, may be strong and rigid in the active axis, e.g., Z axis, and less rigid along the planes substantially perpendicular to the rod 273. The piston 272 further includes a widened surface, such as plate 276, at the internal end 275 of the rod 273. The plate 276, in the presence of vibration from the system 10, acts to permit the passive damper 27 to generate the necessary damping effect. The plate 276, in an embodiment, may be a solid plate. However, plate 276 may also be perforated to adjust the damping effect. Although described as a fluid damper, passive damper 26 may be any passive dampers known in the art.

As the piston 272 moves up and down within the body portion 263 of the intermediate mass 26 to generate the necessary damping effect, in order to minimize the occurrence of the piston 272 being dislodged from within the body portion 263 of the intermediate mass 26, the plate 276 may be made to have a width that may be measurably larger than the opening 264 in the top end 261 of the intermediate mass 26. In addition, fasteners 265 may be used to secure the top end 261 to the body portion 263 of the intermediate mass 26 so that movement of the piston 272 does not dislodge the top end 261 from the body portion 263. Fasteners 265 may be a screw/bolt combination, a clamp, or any know fastening mechanisms known in the art, for instance the top end 261 and the body portion 263 may be provided with complementary threading for rotating the top end 261 onto the body portion 263. Furthermore, to conserve potential loss of the viscous fluid 271 from within the body portion 263 of the intermediate mass 26 during movement of the piston 272, a cover 276, such as a flexible membrane, may be positioned across the opening 264. When cover 276 is used, it may be necessary to create a hole (not shown) within the cover 276, so that the rod 273 of piston 272 may be accommodated therethrough. The hole, in one embodiment, may be sufficiently small, so as to create a substantially tight seal with the rod 273 of piston 272.

With reference now back to FIG. 1, system 10 may be designed to control the expansion and contraction of the actuator 15 through the application of a feedback compensation loop or system 19. The loop 19 includes, among other things, a compensation/amplifier module 191. In one embodiment, the module 191 may be designed to apply a variable voltage to actuator 15, for example, about 800 volts DC may be applied to actuator 15 in a steady state condition. The loop 19 also includes, in an embodiment, a motion sensor 18, positioned on the intermediate mass 16 (see also item 28 in FIG. 2), for generating a signal which can be integrated to obtain motion or displacement displayed by the intermediate mass 16. In particular, a sensor signal may be communicated from the sensor 18 to module 191, which integrates the signal to obtain displacement and boosts gain. The resulting integrated signal may thereafter be processed by the module 191, which contains various compensation circuits, to control the expansion and contraction of the actuator 15.

Sensor 18, in one embodiment, may be a servo-accelerometer or, preferably, a geophone. A geophone generally includes a coil of wire supported on relatively low stiffness mechanical springs with a magnetic field passing through the coil. The magnetic field induces a voltage in the coil, which may be proportional to the relative velocity of the coil with respect to the geophone case holding the magnet, the strength in the magnetic field passing through the coil, and the number of turns of wire within the coil. The geophone also has low cost, low noise and high sensitivity. The geophone and the related compensation circuits used in connection with the present invention may be similar to that disclosed in U.S. Pat. No. 5,823,307, which patent is hereby incorporated herein by reference.

Figure 3:
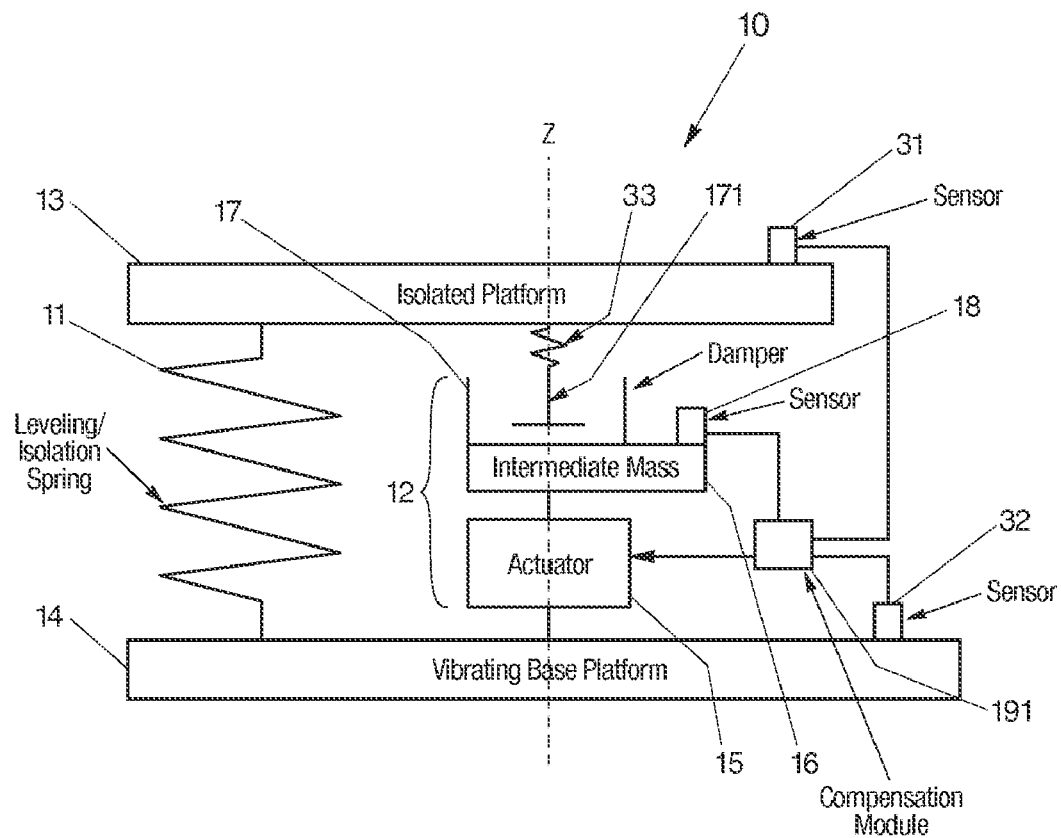
FIG. 3 illustrates a system for active vibration isolation or damping, in accordance with another embodiment of the present invention.

Referring now to FIG. 3, as noted previously, many of the supported payloads on isolated platform 13, when isolated in the system 10, involve moving mechanical components which can generate forces that act on the payload and cause it to vibrate in response. Accordingly, it may be desirable to have the damping system 10 resist or minimize supported payload movement due to payload-induced forces. To do so, a second motion sensor 31 may be used in connection with the system 10. Sensor 31, which may be an absolute velocity sensor or a relative displacement sensor, may be mounted on the isolated platform 13. Signals from sensor 31 may be combined and integrated with signals from sensor 18 on the intermediate mass 16 to subsequently enhance vibration control of the isolated platform 13.

In a further embodiment, the system 10 may include a third motion sensor 32 mounted on the vibrating base platform 14 or floor. A signal from sensor 32 may be communicated to module 191, which then integrates the signal to obtain displacement and boosts gain. The resulting integrated signal may thereafter be processed by the module 191, which contains various compensation circuits, and used as a feed-forward signal to control the expansion and contraction of the actuator 15 to compensate for the vibrating base motion.

Still referring to FIG. 3, system 10 may also include a spring 33 attached, in series, at one end to isolated platform 13 and attached at an opposite end to passive damper 17. In the embodiment illustrated in FIG. 3, spring 33 may be coupled piston 171 of passive damper 17. In this manner, spring 33, having a resonance frequency of at least one order of magnitude higher than that of supporting spring 11, may enhance vibration isolation gain to the system 10 at higher frequencies.

Figure 4:
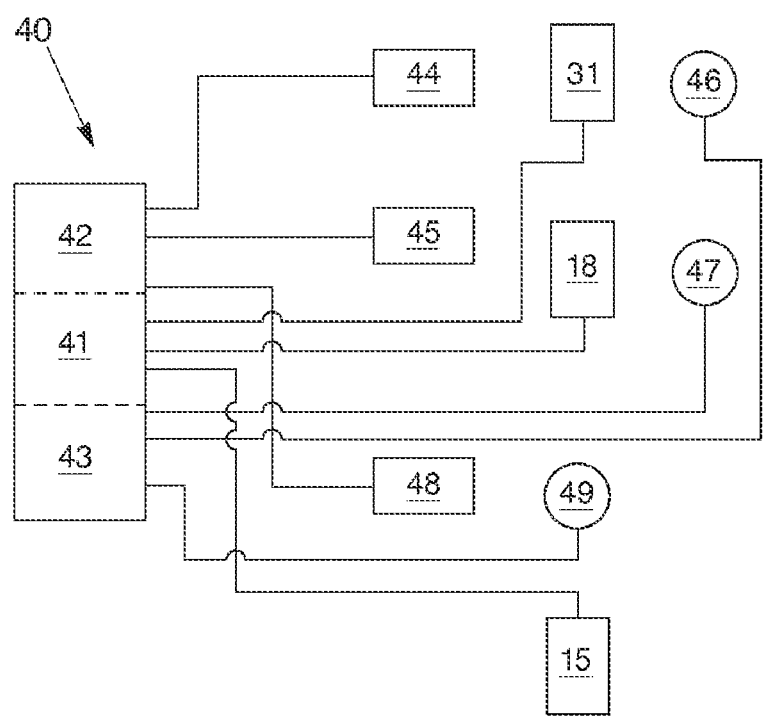
FIG. 4 is an electrical schematic block diagram illustrating the electrical interconnections between motion sensors, compensation circuitry and actuators for a three-dimensional vibration isolation or damping system.

Although illustrated to actively isolate vibration along one axis, i.e., the "Z" axis, the intermediate mass and system of the present invention may be designed to actively isolate vibration along each of the "X", "Y", and "Z" axes. Looking now at FIG. 4, there is shown a high-level electrical schematic diagram illustrating the electrical interconnections between the motion sensors, compensation circuitry and actuators for a three-dimensional vibration damping system. An electronic controller indicated generally at 40 includes compensation circuits 41, 42 and 43. Each of these compensation circuits is similar to that disclosed in U.S. Pat. No. 5,823,304, which, as noted previously, is incorporated herein by reference.

Compensation/control circuit 41, in one embodiment, is provided to receive sensor signals from the "Z" vertical payload sensor 31, which senses motion of the payload along the "Z" axis, and from the "Z" vertical intermediate mass sensor 18, which senses motion of the intermediate mass along the "Z" axis. Compensation/control circuit 42, on the other hand, receives sensor signals from a "Y" horizontal payload sensor 44, which senses motion of the payload along the "Y" axis, and from a "Y" intermediate mass sensor 45, which senses motion in the "Y" direction of the intermediate mass. As for compensation/control circuit 43, it receives signals from a "X" horizontal payload sensor 46 and a "X" direction intermediate mass sensor 47.

In one embodiment, output control signals from circuit 41 may be transmitted, for example, to "Z" vertical actuator 15, whereas output control signals from circuit 42 may be transmitted to a "Y" radial actuator 48. Output control signals from circuit 43, similarly may be transmitted to a "X" radial actuator 49. As can be seen, the sensor/motor arrangement has substantially no electronic crosstalk. In addition, the use of various shear decouplers, as described below, can further obviate the need for handling physical crosstalk.

It should be appreciated that the compensation circuitry of the present invention may be implemented in analog or digital form. In addition, such compensation circuitry may be adapted to receive signals from the sensor situated on the vibrating base platform, such as sensor 32 in FIG. 3. Moreover, the compensation circuitry may be employed as a single module capable of receiving motion signals from each of six degrees of freedom and compensating for vibrations therealong. Alternatively, a plurality of compensation modules, for instance, six, may be used, with each provided for each of the six degrees of freedom.

Figure 5:
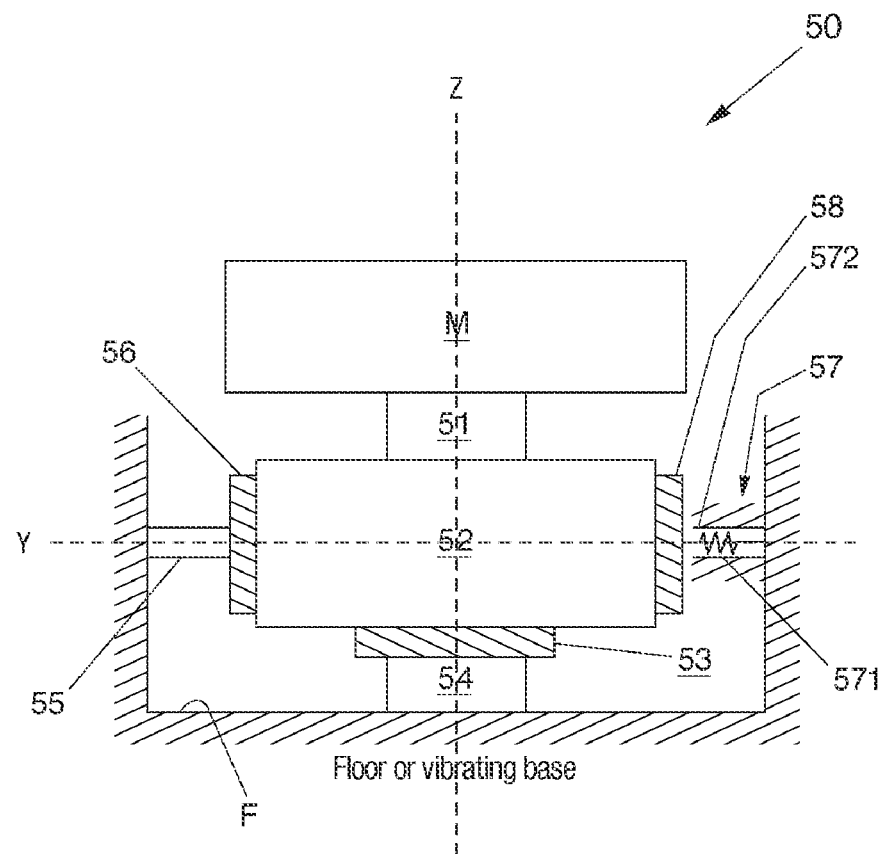
FIG. 5 illustrates a simplified schematic diagram of an active vibration damping system along two axes.

Looking now at FIG. 5, a simplified schematic diagram of an active vibration damping system 50 is illustrated in two dimensions. System 50 includes a supported payload M which rests on a passive damper 51, which in turn may be supported by an intermediate mass 52. A shear decoupler 53 may be interposed between the intermediate mass 52 and a vertical actuator 54. In general, an actuator should be configured so that tension loading does not occur in axial loading or in bending loading. Shear loading of the actuator may be allowable, so long as the shear loading does not generate bending moments that can cause tensile loading in part of the actuator. To limit or minimize shear loading within the actuator, a shear decoupler may be used. A shear decoupler is a well known apparatus and typically includes a first stiff plate or element adjoining an end of the actuator, a second stiff plate or element, which adjoins the intermediate mass, and a thin disk or wafer of elastomeric material between the stiff plates. The stiff plates, in one embodiment, may be made from a non-elastic material such as metal or the like.

System 50 also provides active vibration isolation in a direction normal to the force exerted by the payload, i.e., along the "Y" axis. This isolation may be performed using a radial actuator 55, for instance, a piezoelectric motor, and a radial shear decoupler 56 situated between the actuator 55 and the intermediate mass 52. The radial actuator 55, in an embodiment, may be attached in some manner to the vibrating floor, external casing, base F. It should be appreciated that the axial stiffness of each shear decoupler may be maintained high, while the radial stiffness may be maintained relatively low, when the ratio of the loaded area to unloaded area is large. In an embodiment of the invention, the ratio of axial stiffness to radial stiffness of the shear decoupler may be at least one, and preferably two or more orders of magnitude.

As it is desirable that the intermediate mass 52 move only along the "Z" axis, and not to rotate as the vertical actuator 54 extends and/or contracts, shear decoupler 56 may be balanced on the other side of intermediate mass 52 by shear decoupler 58 and spring element 57. The presence of the shear decoupler 58 and spring element 57 may also assist in the preloading of radial actuator 55, in the embodiment wherein the radial actuator 55 is a piezoelectric stack, so that under actual operation the actuator 55 does not goes into tension. In particular, compression spring element 57 may be used to preload the radial actuator 55. The spring element 57, in an embodiment, includes a spring 571, such as a conical steel spring, and a rubber or elastomer coaxial bushing 572 for guiding the spring 571. The spring element 57, as shown in FIG. 5, may be disposed between a vibrating source, e.g., an extension of the floor, external casing, or vibrating base F, and shear decoupler 58, which in turn may be situated between the spring element 57 and the intermediate mass 52. The linear arrangement of radial actuator 55, shear decoupler 56, shear decoupler 58 and spring element 57 may be repeated in a direction normal to the paper, i.e., "X" axis, from the perspective in FIG. 5, to achieve vibration isolation in all three dimensions and along six degrees of freedom.

Spring element 57, in one embodiment, may be designed to have relatively low stiffness along the "Y" axis, and relatively high radial stiffness in all directions normal to the "Y" axis. In this manner, the spring element 57 may allow radial actuator 55 to contract or elongate readily according to the command signal applied to it. Moreover, the interposition of the decoupler 56 between the radial actuator 55 and the intermediate mass 52 can lower the shear deflection caused by, e.g., movement of payload-supporting vertical actuator 54, to about 0.7% of the movement of radial actuator 55, in one example.

In summary, an active vibration damping system has been shown and described. The vibration damping system, according to an embodiment of the invention, decouples static and dynamic forces generated by a payload so that each can be addressed separately by independent mechanisms. By decoupling these forces, enhanced reduction of the dynamic vibration from the payload can be achieved. Specifically, the system provides an supporting spring and an independent actively isolated damper interposed between the payload mass (i.e., isolated platform) and the vibrating source (i.e., base platform) to reduce the resonant frequency and necessary gain. The supporting spring acts to support and address static forces, i.e., the weight, from the payload to maintain the isolated platform in substantial parallel relation to the base platform. The active damper, on the other hand, addresses dynamic vibration from the payload and includes at least one actuator, an intermediate mass supported by the actuator, and a passive damper between the intermediate mass and the isolated platform. The intermediate mass, in addition to being supported by the actuator vertically along the "Z" axis, may be supported radially by additional actuators along "X" and "Y" axes. The system also provides circuitry to drive the actuators as a function of displacement signals generated from sensors in the intermediate mass in the vertical direction or in each of the "X", "Y", and "Z" directions. In an embodiment, since the active damper does not support the weight of the payload, the actuator used in connection with the active damper of the present invention can be relatively smaller and less expensive than that used in a traditional vibration isolation system where the weight of the payload must also be supported by the actuator.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. A system for damping vibration from a supported payload, the system comprising:
   a supporting spring extending at one end from an isolated platform on which the payload is supported to an opposing end attached to a base platform opposite the isolated platform for supporting static forces from the payload;
   an active damper extending between the isolated platform and the base platform in parallel to and spaced relation from the supporting spring for damping dynamic forces from the payload, the active damper including:
      an actuator having first and second opposing ends and being variable in length between the first and second ends, the second end being coupled to the base platform, the actuator being statically decoupled from the payload, so as to avoid transference of static forces from the payload to the actuator;
      an intermediate mass having a body portion and in axial alignment atop the first end of the actuator, the intermediate mass providing a stability point to which dynamic forces can be isolated from the payload and can be dampened; and a passive damper having a piston coupled to the isolated platform at one end and extending toward the intermediate mass at an opposite end to the stability point; and a motion sensor coupled to the intermediate mass of the active damper to generate a signal which is a function of movement of the intermediate mass to provide feedback to the actuator, so as to permit the actuator to generate the stability point on the intermediate mass.

2. A system as set forth in claim 1, wherein the supporting spring is coupled to the isolated platform at one end and the base platform at an opposite end, and further acts to maintain the isolated platform in substantial parallel relations to the base platform.

3. A system as set forth in claim 1, wherein the supporting spring is at least one order of magnitude lower in stiffness than that exhibited by the actuator.

4. A system as set forth in claim 1, wherein the intermediate mass is at least one order of magnitude smaller in mass than the payload.

5. A system as set forth in claim 1, wherein the body portion of the intermediate mass can accommodate a volume of a viscous fluid.

6. A system as set forth in claim 5, wherein the body portion of intermediate mass includes a bottom end and a top end having an opening through which the piston of the passive damper may extend.

7. A system as set forth in claim 6, wherein the opening may be sufficiently sized to minimize the occurrence of the piston being dislodged from the body portion.

8. A system as set forth in claim 6, wherein the intermediate mass includes a membrane extending across the opening to minimize loss of the viscous fluid from the body portion.

9. A system as set forth in claim 5, wherein the piston includes a plate attached to the end of the piston within the viscous fluid to allow the passive damper to generate the necessary a damping effect.

10. A system as set forth in claim 1, wherein the intermediate mass and the passive damper are separate components.

11. A system as set forth in claim 1, wherein the active damper further includes a shear decoupler between the intermediate mass and the first end of the actuator to limit the exertion of shear stresses on the actuator.

12. A system as set forth in claim 1, wherein the active damper further includes a spring about the body portion of the intermediate mass and between a top end and bottom end of the intermediate mass to assist in pushing the actuator into a preload compressed position.

13. A system as set forth in claim 1, further including a compensation module having circuitry coupling the motion sensor to the actuator, so as to vary the length of the actuator based on the signal from the motion sensor, such that the active damper acts to stabilize the isolated platform over a predetermined range of vibration frequencies.

14. A system as set forth in claim 13, further including a motion sensor coupled to the isolated platform to generate a signal which is a function of movement of the isolated platform, the motion sensor on the isolated platform being in communication with the compensation module such that signals from this sensor may be combined with the motion sensor on the intermediate mass to provide enhanced vibration control of the isolated platform.

15. A system as set forth in claim 13, further including a motion sensor coupled to the base platform to generate a signal which is a function of movement of the base platform, this sensor being in communication with the compensation module such that signals from this sensor can be used as feed-forward signals to compensate for vibration from the base platform.

16. A system as set forth in claim 1, further including a spring attached in series at one end to the isolated platform and at an opposite end to the passive damper.

17. A system for damping vibration from a supported payload, the system comprising:

a supporting spring extending at one end from an isolated platform on which the payload is supported to an opposing end attached to a base platform opposite the isolated platform for supporting static forces from the payload;

an intermediate mass in parallel to and spaced relation from the supporting spring for providing a stability point to which dynamic forces can be isolated from the payload and may be dampened;

a plurality of actuators, each being variable in length along a respective axis, each actuator having a first end adjoining the intermediate mass and second opposing end coupled to a support susceptible to vibration, each actuator being statically decoupled from the payload, so as to avoid transference of static forces from the payload to each actuator;

a motion sensor coupled to the intermediate mass to generate a signal which is a function of movement of the intermediate mass to provide feedback to the actuator, so as to permit the actuator to generate the stability point on the intermediate mass and;

a shear decoupler between the intermediate mass and the first end of each actuator to limit the exertion of shear stresses on the actuator.

18. A system as set forth in claim 17, wherein the supporting spring is coupled to the isolated platform at one end and the base platform at an opposite end, and further acts to maintain the isolated platform in substantial parallel relations to the base platform.

19. A system as set forth in claim 17, wherein the supporting spring is at least one order of magnitude lower in stiffness than that exhibited by the actuator.

20. A system as set forth in claim 17, wherein the intermediate mass is at least one order of magnitude smaller in mass than the payload.

21. A system as set forth in claim 17, further including a passive damper in axial alignment with the intermediate mass, the passive damper having a volume of a viscous fluid and a piston coupled to the isolated platform at one end and extending into the volume of viscous fluid at an opposite end.

22. A system as set forth in claim 21, wherein the intermediate mass includes a body portion for accommodating the volume of the viscous fluid.

23. A system as set forth in claim 21, further including a second spring attached in series at one end to the isolated platform and at an opposite end to the passive damper.

24. A system as set forth in claim 17, further including a compensation module having circuitry coupling the motion sensor to the actuator, so as to vary the length of the actuator based on the signal from the motion sensor, such that the actuator acts to stabilize the payload mass over a predetermined range of vibration frequencies.

25. A system as set forth in claim 24, further including a motion sensor coupled to the isolated platform to generate a signal which is a function of movement of the isolated platform, the motion sensor on the isolated platform being in communication with the compensation module such that signals from this sensor may be combined with the motion sensor on the intermediate mass to provide enhanced vibration control of the isolated platform.

26. A system as set forth in claim 24, further including a motion sensor coupled to the base platform to generate a signal which is a function of movement of the base platform, this sensor being in communication with the compensation module such that signals from this sensor can be used as feed-forward signals to compensate for vibration from the base platform.

\* \* \* \* \*